US008654401B2

(12) United States Patent
Cave

(10) Patent No.: US 8,654,401 B2
(45) Date of Patent: Feb. 18, 2014

(54) GENERATING 1-BIT IMAGE DATA FROM MULTIPLE-BIT IMAGE DATA FOR PRODUCING WHEN PRINTED A DOT IMAGE WITH REDUCED GRAININESS AND PATTERNING BY FREEING IMAGE OF BLOCKS OF ADJACENT DOTS WITH DENSITIES BELOW A THRESHOLD

(76) Inventor: Andrew William Peter Cave, Oakington (GB)

( * ) Notice: Subject to any disclaimer, the term of this patent is extended or adjusted under 35 U.S.C. 154(b) by 90 days.

(21) Appl. No.: 13/395,094

(22) PCT Filed: Sep. 9, 2010

(86) PCT No.: PCT/GB2010/001702
§ 371 (c)(1),
(2), (4) Date: May 4, 2012

(87) PCT Pub. No.: WO2011/030102
PCT Pub. Date: Mar. 17, 2011

(65) Prior Publication Data
US 2012/0218567 A1      Aug. 30, 2012

(30) Foreign Application Priority Data
Sep. 11, 2009   (GB) .................................. 0915979.9

(51) Int. Cl.
*H04N 1/407* (2006.01)
*H04N 1/405* (2006.01)
*H04N 1/409* (2006.01)

(52) U.S. Cl.
CPC ............... *H04N 1/407* (2013.01); *H04N 1/409* (2013.01); *H04N 1/405* (2013.01)
USPC ........ 358/3.01; 358/3.06; 358/3.21; 358/3.26

(58) Field of Classification Search
USPC ............. 358/1.9, 3.01–3.06, 3.09, 3.11–3.23, 358/521, 533–536; 347/15, 131, 240, 251
See application file for complete search history.

(56) References Cited

U.S. PATENT DOCUMENTS 4,651,228 A *   3/1987   Koch .......................... 358/3.14
4,654,721 A     3/1987   Goertzel et al.
(Continued)

OTHER PUBLICATIONS

Neuhoff, D. L., et al., "One-dimensional Least-squares Model-based Halftoning," Speech Processing 1. San Francisco, Mar. 23-26, 1992, Proceedings of the International Conference on Acoustics, Speech and Signal Processing (ICASSP), New York, IEEE, U.S., vol. 3, Mar. 23, 1992, pp. 189-192.

(Continued)

*Primary Examiner* — Scott A Rogers
(74) *Attorney, Agent, or Firm* — Dascenzo Intellectual Property Law, P.C.

(57) ABSTRACT

A process for receiving data comprising multiple-bit pixel values and deriving therefrom 1-bit image data comprising "on" and "off" pixel values, each corresponding to a pixel on an output medium, which an output device would attempt to mark when printing the 1-bit image data if the pixel value were "on", the 1-bit image data producing when printed an image constituted by a plurality of densities of dots, the dots being arranged such that, at least for densities of dots greater than a first threshold density, at least a majority of dots form a pair with at least one horizontally or vertically adjacent dot, and for densities of dots less than a second threshold density, the image is substantially free of blocks of 2*2 horizontally and vertically adjacent dots, the second threshold density being greater than the first threshold density. Additionally or alternatively dot arrangements are disclosed.

28 Claims, 10 Drawing Sheets

(56) References Cited

U.S. PATENT DOCUMENTS

| | | | |
|---|---|---|---|
| 5,087,981 | A | 2/1992 | Ng et al. |
| 5,278,671 | A | 1/1994 | Takahashi et al. |
| 5,475,497 | A | 12/1995 | Neuhoff et al. |
| 5,526,438 | A * | 6/1996 | Barton ............... 358/3.2 |
| 5,602,572 | A | 2/1997 | Rylander |
| 5,854,882 | A | 12/1998 | Wang |
| 5,920,682 | A * | 7/1999 | Shu et al. ............... 358/3.17 |
| 7,253,927 | B2 * | 8/2007 | Chien et al. ............... 358/3.06 |
| 8,045,233 | B2 * | 10/2011 | Li et al. ............... 358/3.06 |
| 8,368,959 | B2 * | 2/2013 | Stevens ............... 358/3.06 |
| 2005/0190385 | A1 | 9/2005 | Chang |
| 2008/0246999 | A1 | 10/2008 | Guo |
| 2012/0218606 | A1 * | 8/2012 | Ishii ............... 358/3.06 |

OTHER PUBLICATIONS

Pappas, T. N., et al., "Printer Models and Error Diffusion," IEEE Transactions on Image Processing, IEEE Service Center, Piscataway, New Jersey, U.S., vol. 4, No. 1, Jan. 1, 1995, pp. 66-80.

* cited by examiner

Fig. 3

200 — 214 (top-right block)
| 140 | 138 | 136 | 134 |
| 141 | 139 | 137 | 135 |
| 142 | 139 | 136 | 132 |
| 142 | 140 | 136 | 133 |

216 (middle-right block)
| 143 | 141 | 139 | 136 |
| 145 | 142 | 140 | 137 |
| 143 | 140 | 138 | 135 |
| 140 | 138 | 135 | 133 |

226 (bottom-right block)
| 140 | 137 | 132 | 130 |
| 137 | 134 | 133 | 128 |
| 135 | 133 | 127 | 126 |
| 133 | 130 | 122 | 120 |

212 (top-middle block)
| 138 | 139 | 140 | 141 |
| 140 | 140 | 141 | 142 |
| 140 | 141 | 142 | 144 |
| 140 | 142 | 142 | 143 |

218 (center block)
| 150 | 145 | 143 | 144 |
| 145 | 145 | 144 | 146 |
| 140 | 140 | 142 | 145 |
| 138 | 139 | 140 | 142 |

224 (bottom-middle block)
| 135 | 137 | 139 | 140 |
| 128 | 132 | 135 | 137 |
| 128 | 129 | 132 | 134 |
| 127 | 127 | 129 | 132 |

210 (top-left block)
| 127 | 130 | 134 | 138 |
| 130 | 128 | 130 | 134 |
| 134 | 130 | 134 | 138 |
| 138 | 134 | 138 | 140 |

220 (middle-left block)
| 138 | 133 | 138 | 140 |
| 138 | 133 | 138 | 140 |
| 138 | 137 | 138 | 139 |
| 134 | 133 | 135 | 136 |

222 (bottom-left block)
| 130 | 127 | 130 | 133 |
| 127 | 127 | 128 | 130 |
| 126 | 125 | 127 | 128 |
| 125 | 124 | 123 | 127 |

GENERATING 1-BIT IMAGE DATA FROM MULTIPLE-BIT IMAGE DATA FOR PRODUCING WHEN PRINTED A DOT IMAGE WITH REDUCED GRAININESS AND PATTERNING BY FREEING IMAGE OF BLOCKS OF ADJACENT DOTS WITH DENSITIES BELOW A THRESHOLD

FIELD OF THE INVENTION

This invention relates to a computer program for generating 1-bit image data from multiple-bit image data, and more particularly to a computer program for generating 1-bit image data that, when printed, produce an image constituted by a plurality of densities of dots and having little or no appearance of graininess or patterning to a human eye.

BACKGROUND TO THE INVENTION

Computer programs for generating 1-bit image data comprising "on" and "off" pixel values from multiple-bit image data, which 1-bit image data, when printed, produce an image that is constituted by dots, are well known, the process of generating the 1-bit image data being known as "screening".

Such computer programs fall into two broad categories. The first category carry out so-called "amplitude modulated" (AM) screening to generate 1-bit image data that, when printed, produce an image that is constituted by a plurality of sizes of dots, the dots being regularly spaced throughout the image.

The second category carry out so-called "frequency modulated" (FM) screening to generate 1-bit image data that, when printed, produce an image that is constituted by a plurality of densities of dots, the dots typically all having the same size.

There are various problems with AM screening, the most significant of which are colour shift and formation of Moiré patterns when two or more screened images are overlaid, as occurs in colour printing.

These problems are caused by the regular spacing of the dots and do not arise in FM screening. There are, however, different problems with FM screening, the most significant of which are the appearance of graininess of the image and the appearance of patterning of the image.

The appearance of graininess occurs because of the irregular spacing of the dots throughout the image. Whereas the human eye readily disregards the regularly spaced individual dots making up an image produced by AM screening, it struggles to disregard the irregularly spaced individual dots making up an image produced by FM screening, which gives the image the appearance of graininess. This is exacerbated where the image contains clusters of adjacent dots among irregularly spaced individual dots, as such clusters are extremely conspicuous.

Each pixel value of the 1-bit image data corresponds to a pixel of an output medium. When printing the 1-bit image data, an output device attempts to mark those pixels of the output medium which correspond to "on" pixel values of the 1-bit image data. Although a few output devices can fully mark a pixel of the output medium without marking adjacent pixels, most output devices either do not fully mark the pixel, which gives rise to so-called "dot loss", or also mark adjacent pixels, which gives rise to so-called "dot gain".

The appearance of patterning results from dot gain because pairs of diagonally adjacent marked pixels exhibit more dot gain than pairs of horizontally or vertically adjacent marked pixels. Dot gain also causes isolated pixels corresponding to "off" pixel values of the 1-bit image data, referred to in this specification as "non-pixels", i.e. non-pixels surrounded by marked pixels, to have a greater proportion of their areas marked, if not all of their areas, as a result of marking the surrounding pixels, than the non-pixels of isolated pairs of horizontally or vertically adjacent non-pixels.

FIG. 1 represents a portion 10 of an output medium on which a pair of horizontally adjacent pixels 12 and 14, a pair of vertically adjacent pixels 16 and 18, and a pair of diagonally adjacent pixels 20 and 22 have been marked by an output device that produces dot gain. As can be seen from FIG. 1, marking of the pair of horizontally adjacent pixels 12 and 14 causes six regions 24, 26, 28, 30, 32 and 34 of the surrounding pixels also to be marked as a result of dot gain. Marking of the pair of vertically adjacent pixels 16 and 18 also causes six regions 36, 38, 40, 42, 44 and 46 also to be marked. Marking of the pair of diagonally adjacent pixels 20 and 22, however, causes eight regions 48, 50, 52, 54, 56, 58, 60 and 62 also to be marked. The pair of diagonally adjacent marked pixels 20 and 22 would therefore appear darker than the pairs of horizontally and vertically adjacent marked pixels 12 and 14 and 16 and 18.

Portions of an image containing isolated pairs of diagonally adjacent marked pixels, such as marked pixels 20 and 22 of FIG. 1, or multiple lines of diagonally adjacent marked pixels, can have an appearance of patterning, because the isolated pairs of diagonally adjacent marked pixels and the multiple lines of diagonally adjacent marked pixels appear darker than nearby pairs of horizontally and vertically adjacent marked pixels. Portions of an image containing both isolated non-pixels and isolated pairs of horizontally and vertically adjacent non-pixels can also have an appearance of patterning, because the isolated pairs of horizontally and vertically adjacent non-pixels appear much lighter than the isolated non-pixels.

For these reasons of graininess and patterning, although FM screening has the potential to produce better printed images than AM screening, it has not been as widely accepted as AM screening.

SUMMARY OF THE INVENTION

According to the invention there is provided a computer program for executing on a computer system a computer process for generating 1-bit image data from multiple-bit image data, the process comprising the steps of:

receiving multiple-bit image data comprising multiple-bit pixel values; and deriving from the multiple-bit pixel values 1-bit image data comprising "on" and "off" pixel values, each pixel value of the 1-bit image data corresponding to a pixel of an output medium, which pixel an output device would attempt to mark when printing the 1-bit image data if the pixel value were "on", the 1-bit image data producing when printed an image constituted by a plurality of densities of dots, the dots being arranged such that, at least for densities of dots greater than a first threshold density, at least a majority of dots form a pair with at least one horizontally or vertically adjacent dot, and for densities of dots less than a second threshold density, the image is substantially free of blocks of 2*2 horizontally and vertically adjacent dots, the second threshold density being greater than the first threshold density.

The invention can provide a computer program that, in certain embodiments, can generate 1-bit image data that, when printed, produce an image that has relatively little appearance of graininess in portions of the image of which the densities of dots are relatively low, be 2*2 blocks of horizontally and vertically adjacent dots would be conspicuous are substantially free of such blocks of dots.

In this specification, "substantially free of" means present in sufficiently low numbers as to be not readily discernible by the human eye.

The multiple-bit image data may, for example, comprise 8-bit continuous tone raster image data.

Some output devices mark pixels of an output medium corresponding to pixel values of the 1-bit image data that are one, whereas other output devices mark pixels corresponding to pixel values of the 1-bit image data that are zero. For the avoidance of doubt, "on" pixel values of the 1-bit image data can be either one or zero, the "off" pixel values then being zero or one, respectively.

The step of deriving the 1-bit image data may advantageously comprise using a threshold array.

In a preferred embodiment of the invention, the step of deriving the 1-bit image data comprises using an error diffusion algorithm.

For the purposes of this specification, an "output medium" is a medium that can be marked so as to cause an image to appear on the medium and an "output device" is a device operable to mark an output medium. Examples of output media include paper, printing plates for use in printing presses and photosensitive film for use in making printing plates. Examples of output devices include inkjet printers, computer-to-film imagesetters, computer-to-plate systems and printing presses.

The dots may advantageously also be arranged such that, at least for densities of dots greater than the first threshold density and less than a third threshold density, at least a majority of dots form a pair with one horizontally or vertically adjacent dot, the third threshold density being less than the second threshold density.

The dots may advantageously also be arranged such that, for all densities of dots, at least a majority of dots form a pair with at least one horizontally or vertically adjacent dot.

It may be, however, that in portions of the image of which the densities of dots are very low, pairs of dots are conspicuous.

Alternatively, therefore, the dots may advantageously also be arranged such that, for densities of dots less than the first threshold density, at least some of the dots have no adjacent dots.

The dots may advantageously also be arranged such that, for densities of dots greater than a fourth threshold density, at least one dot of at least a majority of pairs of dots forms pairs with two horizontally or vertically adjacent dots, the fourth threshold density being greater than the third threshold density and less than the second threshold density.

The dots may advantageously also be arranged such that, for densities of dots less than a fifth threshold density, at least a majority of dots form chains of horizontally or vertically adjacent dots, the chains having similar numbers of dots, and the fifth threshold density being less than the second threshold density.

Where the dots are so arranged, the invention can provide a computer program that can generate 1-bit image data that, when printed, produce an image that has little or no appearance of graininess in portions of the image of which the densities of dots are relatively low, because portions of the image of which the densities of the dots are sufficiently low that chains of horizontally or vertically adjacent dots having substantially different numbers of dots, or 2*2 blocks of horizontally and vertically adjacent dots, would be conspicuous, are substantially free of such chains or blocks of dots.

A portion of an image that could be occupied by a dot, but is not so occupied, will be referred to in this specification as a "non-dot".

It will be apparent that the problems of conspicuous chains of horizontally or vertically adjacent dots having different numbers of dots, and conspicuous blocks of 2*2 horizontally and vertically adjacent dots, in portions of images of which the densities of dots are low, which problems are solved by this invention, have analogues in conspicuous chains of horizontally or vertically adjacent non-dots having substantially different numbers of dots, and conspicuous blocks of 2*2 horizontally and vertically adjacent non-dots, in portions of images of which the densities of dots are high.

In portions of images of which the densities of dots are high, chains of horizontally or vertically adjacent non-dots having different numbers of non-dots, and blocks of 2*2 horizontally and vertically adjacent non-dots, when surrounded by dots, can be conspicuous and give an appearance of graininess, in the same way as such chains and blocks of dots can give an appearance of graininess.

Thus the dots may advantageously also be arranged such that, at least for densities of dots less than a sixth threshold density, at least a majority of portions of the image that could be occupied by a dot, but are not so occupied, form a pair with at least one horizontally or vertically adjacent non-dot, and for densities of dots greater than a seventh threshold density, the image is substantially free of blocks of 2*2 horizontally and vertically adjacent non-dots, the sixth threshold density being greater than the seventh threshold density.

The dots may advantageously also be arranged such that, at least for densities of dots less than the sixth threshold density and greater than an eighth threshold density, at least a majority of non-dots form a pair with one horizontally or vertically adjacent non-dot, the eighth threshold density being greater than the seventh threshold density.

The dots may advantageously also be arranged such that, for all densities of dots, at least a majority of non-dots form a pair with at least one horizontally or vertically adjacent non-dot.

It may be, however, that in portions of the image of which the densities of dots are very high, pairs of non-dots are conspicuous.

Alternatively, therefore, the dots may advantageously also be arranged such that, for densities of dots greater than the sixth threshold density, at least some of the non-dots have no adjacent non-dots.

Where the 1-bit image data are to be printed using an output device that produces relatively little dot gain, the arrangement of the dots such that at least some of the non-dots have no adjacent non-dots can be used, because dot gain of the dots surrounding the non-dots will not significantly reduce the size of the non-dots.

Where the 1-bit image data are to be printed using an output device that produces significant dot gain, however, the arrangement of the dots such that at least some of the non-dots have no adjacent non-dots cannot be used, because dot gain of the dots surrounding the non-dots will significantly reduce the size of the non-dots, or even cause them to disappear.

The dots may advantageously also be arranged such that, for densities of dots less than a ninth threshold density, at least one non-dot of at least a majority of pairs of non-dots forms pairs with two horizontally or vertically adjacent non-dots, the ninth threshold density being less than the eighth threshold density and greater than the seventh threshold density.

The dots may advantageously also be arranged such that, for densities of dots greater than a tenth threshold density, at least a majority of non-dots form chains of horizontally or vertically adjacent non-dots, the chains having similar numbers of non-dots, and the tenth threshold density being greater than the seventh threshold density.

Where the dots are so arranged, the invention can provide a computer program that can generate 1-bit image data that, when printed, produce an image that has little or no appearance of graininess in portions of the image of which the densities of dots are relatively high, because portions of the image of which the densities of the dots are sufficiently high that chains of horizontally or vertically adjacent non-dots having substantially different numbers of non-dots, or 2*2 blocks of horizontally or vertically adjacent non-dots, would be conspicuous, are substantially free of such chains or blocks of non-dots.

In the preferred embodiment of the invention the second threshold density, for densities of dots less than which the image is substantially free of blocks of 2*2 horizontally and vertically adjacent dots, is halfway between a minimum available density of dots and a maximum available density of dots. That is to say, in portions of the image of the second threshold density the number of dots is equal to the number of non-dots.

In the preferred embodiment of the invention the seventh threshold density, for densities of dots greater than which the image is substantially free of blocks of 2*2 horizontally and vertically adjacent non-dots, is also halfway between a minimum available density of dots and a maximum available density of dots.

This is desirable from the point of view of simplicity of the computer program, because the same rules that determine the placement of dots in the image can be used to determine the placement of non-dots in the image.

Each dot of the image may advantageously correspond to a single pixel value of the 1-bit image data. In this way each pixel of an output medium that is marked by an output device constitutes a dot of the image.

Many output devices cannot reliably mark an isolated pixel or an isolated small group of pixels of an output medium, so that some of the pixels of the output medium that correspond to "on" pixel values of the 1-bit image data would not reliably be marked by such output devices.

Thus each dot of the image may advantageously correspond to a plurality of pixel values of the 1-bit image data. In this way each dot of the image is constituted by two or more pixels of an output medium that are marked by an output device.

The plurality of pixel values may advantageously correspond to a row of two or more horizontally adjacent pixels of an output medium or a column of two or more vertically adjacent pixels of an output medium.

The plurality of pixel values preferably correspond to a rectangular or substantially rectangular block of horizontally and vertically adjacent pixels of an output medium.

It will be apparent, however, that the plurality of pixel values could correspond to any pixels of an output medium, the pixels forming any repeating shape or pattern.

Where each dot of the image corresponds to a plurality of pixel values, each of the plurality of pixel values may advantageously be "on".

This can produce dots that can be reliably reproduced on an output medium by an output device that cannot reliably mark an isolated pixel of the output medium.

Alternatively, at least one of the plurality of pixel values may advantageously be "off".

Where each dot of the image corresponds to a plurality of pixel values, which correspond to a rectangular or substantially rectangular block of horizontally and vertically adjacent pixels of an output medium and at least one of the plurality of pixel values is "off", for densities of dots less than the first threshold density, for at least a majority of pairs of horizontally adjacent dots, at least the pixel values corresponding to a first column of vertically adjacent pixels and a last column of vertically adjacent pixels of the pair of blocks of horizontally and vertically adjacent pixels may advantageously be "off", and for at least a majority of pairs of vertically adjacent dots, at least the pixel values corresponding to a first row of horizontally adjacent pixels and a last row of horizontally adjacent pixels of the pair of blocks of horizontally and vertically adjacent pixels may advantageously be "off".

In this way, the size of pairs of dots can be reduced in portions of the image of which the densities of dots are sufficiently low that full-sized pairs of dots would be conspicuous.

Where each dot of the image corresponds to a plurality of pixel values, which correspond to a row of horizontally adjacent pixels or a column of vertically adjacent pixels, for at least a majority of the dots a pixel value corresponding to a first or last pixel of the row, or to a first or last pixel of the column, may advantageously be "off".

Where each dot of the image corresponds to a plurality of pixel values, which correspond to a rectangular or substantially rectangular block of horizontally and vertically adjacent pixels of an output medium and at least one of the plurality of pixel values is "off", alternatively or additionally, for at least a majority of dots, at least some of the pixel values corresponding to at least one of first and last columns of vertically adjacent pixels and at least one of first and last rows of horizontally adjacent pixels of the block of horizontally and vertically adjacent pixels may advantageously be "off".

In this way, dots can be obtained such that horizontally adjacent and vertically adjacent dots exhibit the same amount of dot gain as pairs of diagonally adjacent dots, so that an image can be produced that is substantially free of the appearance of patterning. It is to be noted, however, that pairs of diagonally adjacent dots only occur as part of two pairs of dots.

Moreover, such dots are reduced in size, which has the additional advantage that isolated dots, i.e. dots with no adjacent dots, which might appear conspicuous if full-sized dots were used, are less conspicuous.

The step of deriving from the multiple-bit pixel values 1-bit image data comprising "on" and "off" pixel values may advantageously further comprise identifying multiple-bit pixel values of the multiple-bit image data equal to a minimum available multiple-bit pixel value or a maximum available multiple-bit pixel value, and for each minimum available multiple-bit pixel value generating a corresponding "off" pixel value of the 1-bit image data, and for each maximum available multiple-bit pixel value generating a corresponding "on" pixel value of the 1-bit image data.

Where the step of deriving the 1-bit image data includes this operation, the invention can provide a computer program that can generate 1-bit image data that, when printed, produce an image in which fine details, such as text and straight edges in graphics, which details are present in an image represented by the multiple-bit image data, are preserved.

The invention also lies in an output device in which a program according to the invention is stored.

The invention can also be seen to lie in a computer program for, or method of, generating one-bit image data from multiple bit image data, by a process comprising steps of receiving multiple bit image data comprising multiple bit pixel values; deriving from the multiple bit pixel values one bit image data comprising "on" and "off" pixel values, each pixel value of the one-bit image data corresponding to a pixel of an output medium, which pixel output device would attempt to mark when printing the one-bit image data if the pixel value were "on", the one-bit image data producing, when printed, an image constituted by a plurality of dots arranged with a plurality of number densities; determining whether each said density is above a first threshold and below a second, higher threshold; and ensuring that the dots are arranged with the relationship between each dot and its adjacent dot or dots satisfying at least one criterion which is dependent on said determination, thereby to reduce or avoid the appearance of graininess or patterning in the printed image.

BRIEF DESCRIPTION OF THE DRAWINGS

The invention will now be described, by way of example, with reference to the accompanying drawings, in which:

FIG. 3 is a schematic representation of a portion of an array of 8-bit pixel values that constitute multiple-bit image data;

DETAILED DESCRIPTION OF AN EMBODIMENT

Figure 1:
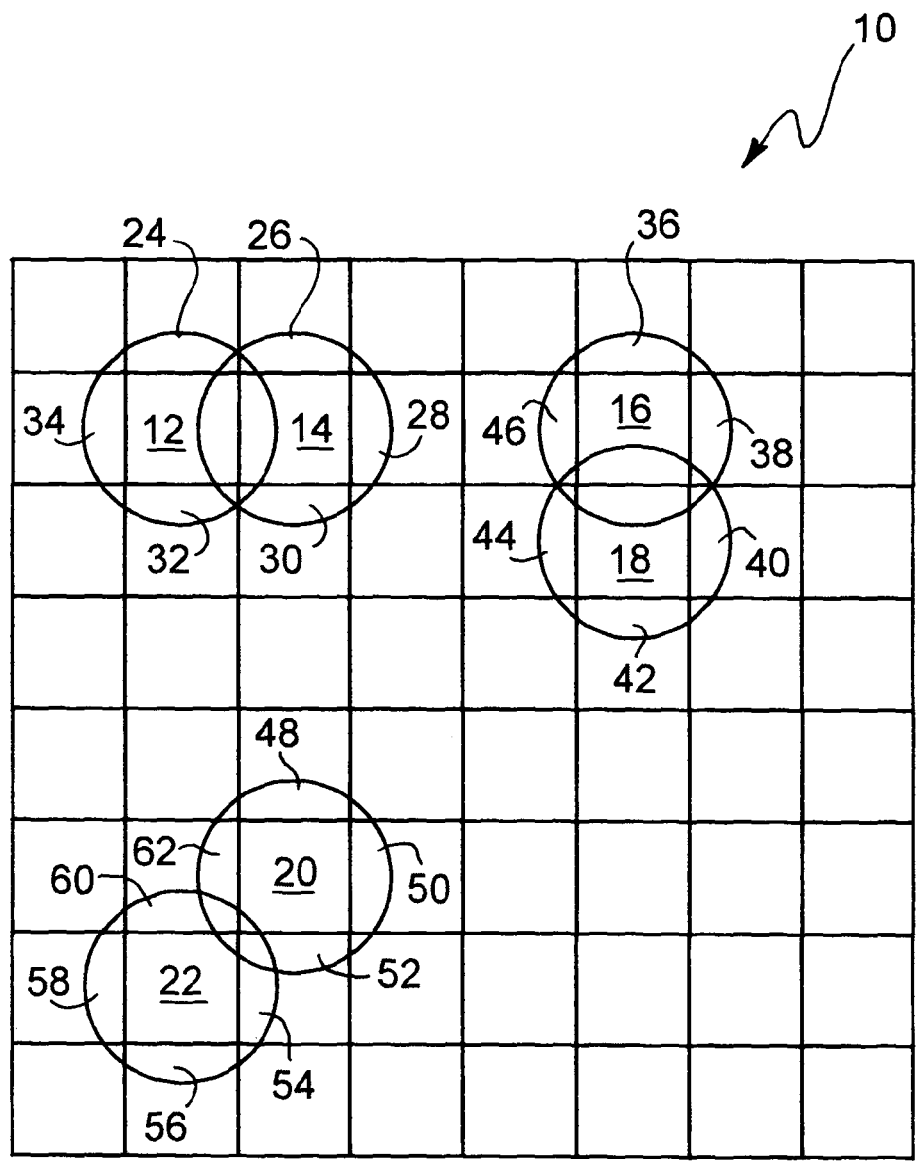
FIG. 1 is a schematic representation of a portion of an output medium.
Figure 2:
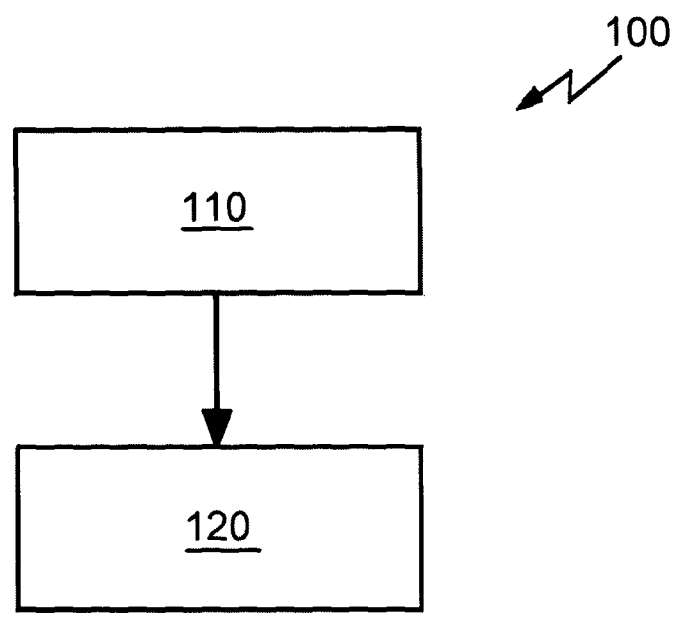
FIG. 2 is a flow diagram of a computer process executed by a computer program in accordance with the invention.

FIG. 2 shows a computer process 100 that is executed by a computer program in accordance with the invention. The computer process comprises first and second steps 110 and 120 respectively.

The first step 110 comprises receiving multiple-bit image data in the form of 8-bit continuous tone raster image data. FIG. 3 represents specimen image data 200, which are part of an array of X*Y pixel values in the range 0 to 255.

Figure 4:
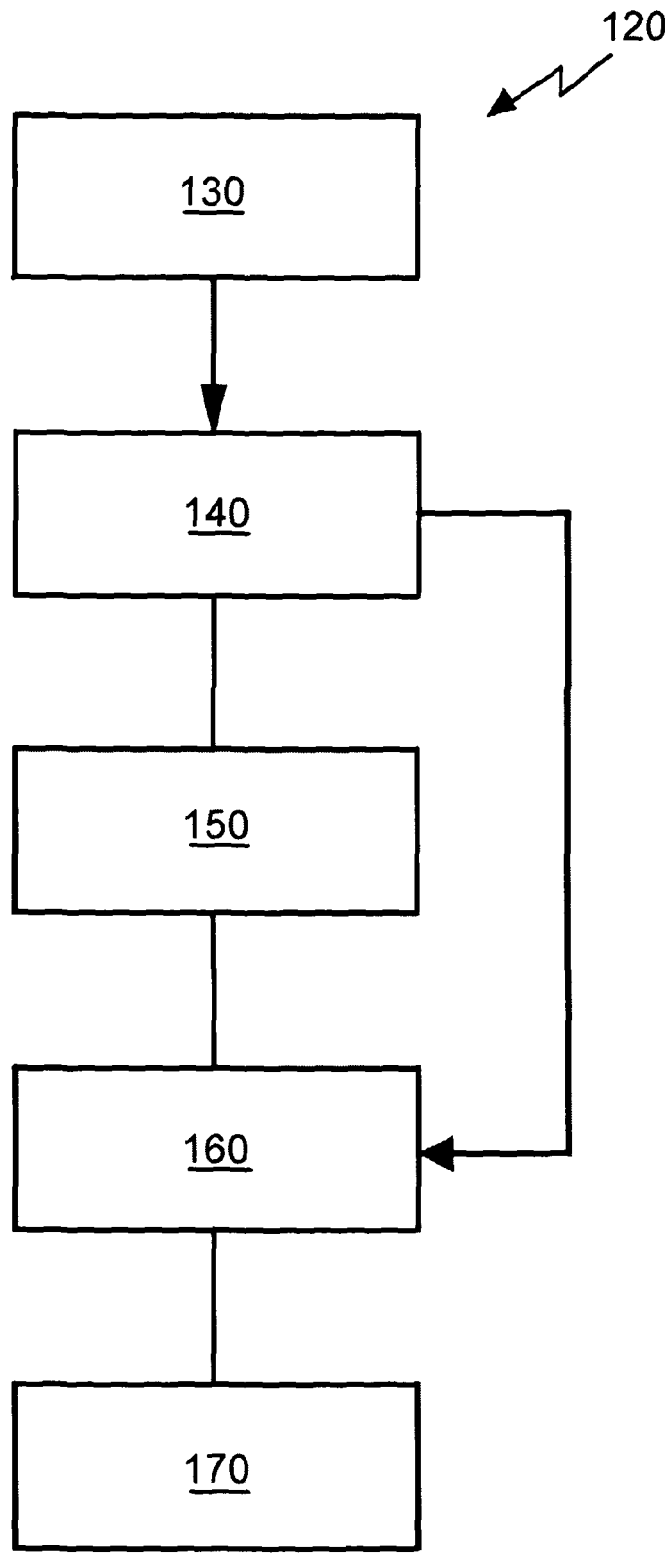
FIG. 4 is a flow diagram of part of the computer process of FIG. 2.

The second step 120 is shown in FIG. 4 and comprises the operations of receiving 130 values defining the size of dot that is to be used to produce an image using the computer program, receiving 140 instructions as to whether pairs of dots are to be used in portions of the image of which the densities of dots are low, if so, receiving 150 instructions as to whether the pairs of dots to be used in portions of the image of which the densities of dots are low are to be of a reduced size, receiving 160 instructions as to whether all dots are to be of a reduced size, and deriving 170 1-bit image data in the form of an array of X*Y "on" and "off" pixel values from the multiple-bit image data, which, when printed on an output medium by an output device, produce an image constituted by dots of the specified size or sizes.

The operation 130 of receiving values defining the size of dot that is to be used to produce the image comprises receiving a first value M that defines a width in pixels of the dot, and a second value N that defines a height in pixels of the dot. Typically M and N are selected to be equal, so that the dot is square, although this is not essential. The computer program provides for the use of dots from 1*1 pixel up to 6*6 pixels.

It will be appreciated that it is desirable for the dots that constitute the image to be as small as possible, because if individual dots of the image cannot be discerned by the human eye, the image is less likely to have an appearance of graininess.

However, although some output devices such as inkjet printers are capable of reliably marking an isolated pixel of an output medium, that is a pixel surrounded by unmarked pixels, many output devices such as printing presses are incapable of marking an isolated pixel, so that these devices could not reliably print an image constituted by 1*1 pixel dots. Indeed, many such devices cannot reliably mark 2*2 pixel dots, although most can reliably mark 3*3 or 4*4 pixel dots. Typically the smallest dot that can reliably be marked by the output device with which the image is to be printed would be selected.

In an image constituted by 3*3 or 4*4 pixel dots, isolated pairs of adjacent dots, that is to say pairs of adjacent dots surrounded by non-dots, may be conspicuous. This will certainly be the case where 5*5 or 6*6 pixel dots are used. It may therefore be desirable to use isolated dots instead of isolated pairs of adjacent dots. Whether isolated dots or isolated pairs of adjacent dots are used in portions of the image of which the densities of dots are low is determined by the instructions received in operation 140.

If in operation 140 it is determined that isolated pairs of adjacent dots are to be used, and not isolated dots, the size of the isolated pairs of dots can be reduced in operation 150. The reduced-size isolated pairs of adjacent dots are less conspicuous than full-sized pairs of adjacent dots, but more conspicuous than isolated dots.

Figure 5:
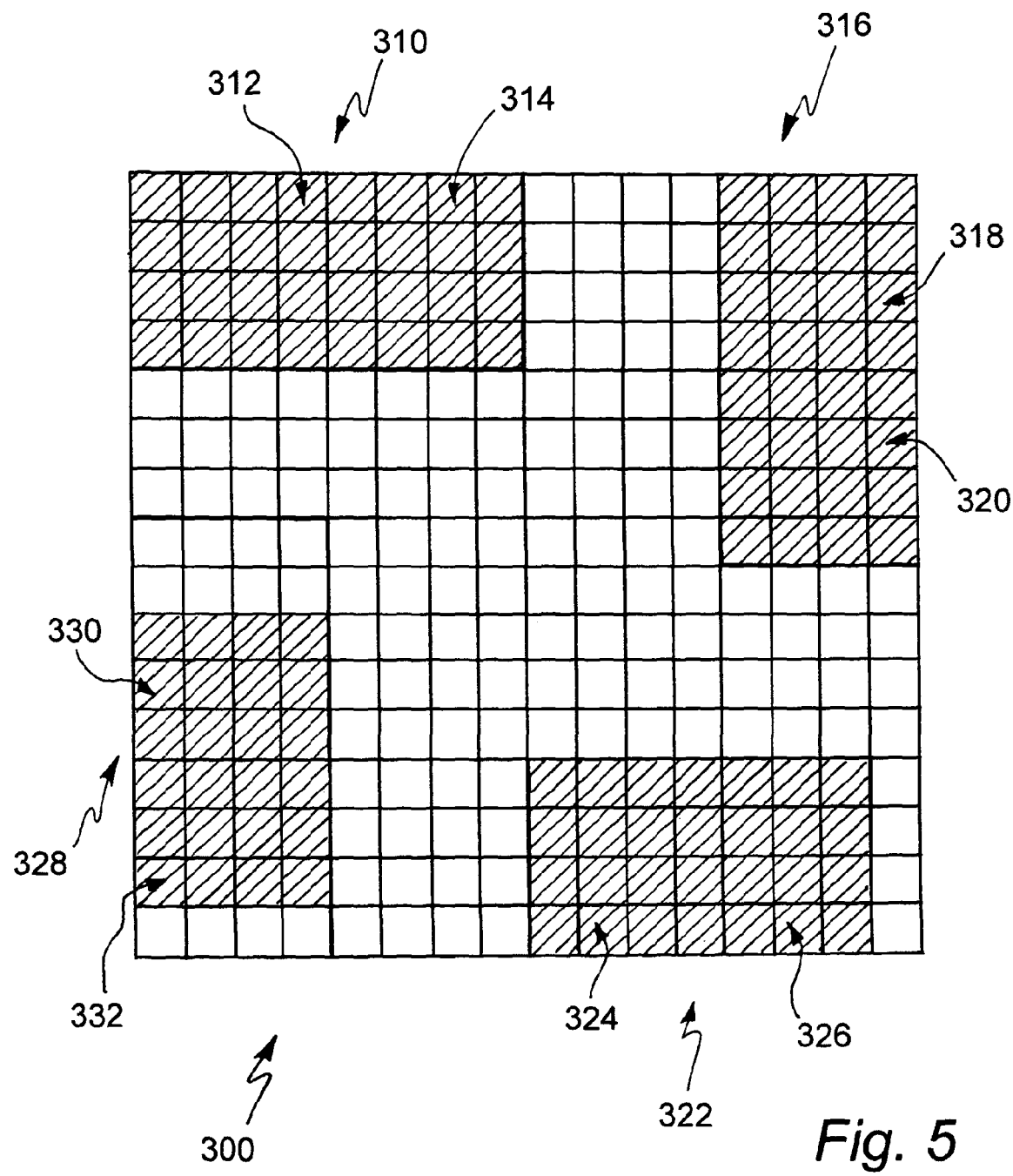
FIGS. 5 and 6 are schematic representations of portions of an output medium.

FIG. 5 represents a portion 300 of an output medium on which a full-sized pair 310 of horizontally adjacent 4*4 pixel dots 312 and 314, a full-sized pair 316 of vertically adjacent 4*4 pixel dots 318 and 320, a reduced-sized pair 322 of horizontally adjacent 4*4 pixel dots 324 and 326, and a reduced-sized pair 328 of vertically adjacent 4*4 pixel dots 330 and 332 have been marked. In order to mark the full-sized pairs of dots 310 and 316, rectangular blocks of 8*4 pixels and 4*8 pixels, respectively, i.e. blocks of 32 horizontally and vertically adjacent pixels, are marked. In order to mark the reduced-sized pairs of dots 322 and 328, rectangular blocks of 6*4 pixels and 4*6 pixels, respectively, i.e. blocks of 24 horizontally and vertically adjacent pixels, are marked. By comparing the full-sized pair 310 of horizontally adjacent dots with the reduced-sized pair 322 of horizontally adjacent dots, it can be seen that the reduced-sized pair 322 is obtained by not marking first and last columns of vertically adjacent pixels that would be marked in order to obtain the full-sized pair 310. It can also be seen that the reduced-sized pair 328 of vertically adjacent dots is obtained by not marking first and last rows of horizontally adjacent pixels that would be marked in order to obtain the full-sized pair 316. It is to be noted that a single full-sized dot is obtained by marking a rectangular block of 4*4 pixels, i.e. 16 pixels. Thus a reduced-sized pair of adjacent dots constituted by 24 marked pixels can be seen to be halfway in size between a full-sized single dot constituted by 16 marked pixels and a full-sized pair of dots constituted by 32 marked pixels.

Where the image is to be printed using an output device that produces dot gain, it may be desirable to use reduced-sized dots for all of the dots that constitute the image. Whether full-sized dots or reduced-sized dots are used is determined by the instructions received in operation 160.

Figure 6:
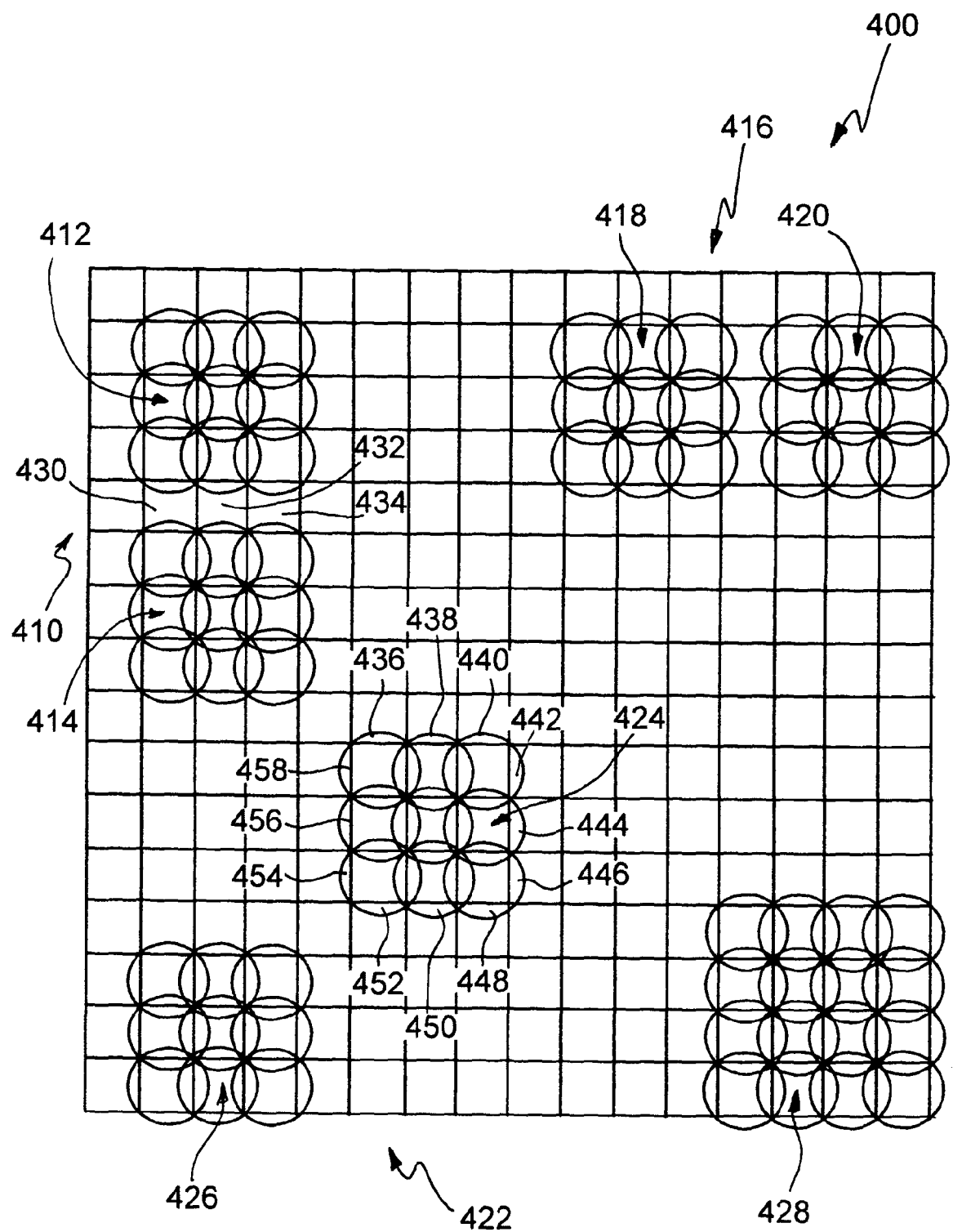

FIG. 6 represents a portion 400 of an output medium on which a pair 410 of reduced-sized vertically adjacent 4*4 pixel dots 412 and 414, a pair 416 of reduced-sized horizontally adjacent 4*4 pixel dots 418 and 420, a pair 422 of reduced-sized diagonally adjacent 4*4 pixel dots 424 and 426, and a full-sized 4*4 pixel dot 428 have been marked by an output device that produces dot gain. From FIG. 6 it can be seen that the reduced-sized dots 412, 414, 418, 420, 424 and 426 are obtained by not marking a first row of horizontally adjacent pixels and a first column of vertically adjacent pixels that would be marked in order to obtain the full-sized dot 428.

If the output device produces sufficient dot gain, there may be no gap visible between the last row of horizontally adjacent marked pixels of the dot 412, for example, and the first row of horizontally adjacent marked pixels of the dot 414. If the dot gain is insufficient to close the gap, it is envisaged that one or more of the three unmarked pixels 430, 432 and 434 between the dots 412 and 414 may be marked.

From FIG. 6 it can be seen that marking of each of the dots 412, 414, 418, 420, 424 and 426 causes twelve regions of the surrounding pixels also to be marked as a result of dot gain, regardless of whether the dot is horizontally, vertically or diagonally adjacent to another dot. The regions marked as a result of marking the pixels of the dot 424 are denoted by reference numerals 436, 438, 440, 442, 444, 446, 448, 450, 452, 454, 456 and 458. The effect of this is that pairs of diagonally adjacent dots appear no darker than pairs of horizontally or vertically adjacent dots, thus avoiding the appearance of patterning that has previously affected images produced using FM screening.

The operation 170 of deriving the 1-bit image data from the multiple-bit image data will now be described in detail, assuming initially that in operation 130 a 4*4 pixel dot was specified, in operation 140 instructions to use pairs of dots in portions of the image of which the densities of dots are low were received, in operation 150 instructions not to use reduced-sized isolated pairs of dots were received, and in operation 160 instructions not to use reduced-sized dots were received.

The array of X*Y 8-bit pixel values is divided into (X/4)*(Y/4) sub-arrays of 4*4 8-bit pixel values. Nine such sub-arrays are shown in FIG. 3, denoted by reference numerals 210, 212, 214, 216, 218, 220, 222, 224 and 226. The average of the pixel values of each such sub-array is calculated and a first intermediate array of (X/4)*(Y/4) average pixel values is generated. A second intermediate array of (X/4)*(Y/4) 1-bit pixel values is also generated, each pixel value of the second intermediate array corresponding to an average pixel value of the first intermediate array, and being set to "off" by default.

It should be noted that where a 1*1 pixel dot is specified, the first and second intermediate arrays are not generated, but the 1-bit image data is instead derived directly from the 8-bit image data, without the use of the intermediate arrays.

The first intermediate array is processed using a highly modified error diffusion algorithm, which is applied to each average pixel value of the first intermediate array in turn, starting at the top left average pixel value, working along the first row of average pixel values to the top right average pixel value, proceeding to the rightmost average pixel value of the second row of average pixel values, working along the second row of average pixel values to the leftmost average pixel value of the second row of average pixel values, proceeding to the leftmost average pixel value of the third row, working along the third row of average pixel values to the rightmost average pixel value, and so on.

For each average pixel value in turn, unless the corresponding pixel value of the second intermediate array has already been set to "on", the error diffusion algorithm determines from the average pixel value and any diffused error whether the corresponding pixel value of the second intermediate array should be set to "on". If it is determined that the corresponding pixel value should be set to "on", a first series of tests are applied based on the average pixel value. If the results of the tests are all negative, the corresponding pixel value is set to "on", otherwise the corresponding pixel value remains set to "off". Similarly, if it is determined by the error diffusion algorithm that the corresponding pixel value should be set to "off", a second series of tests are applied based on the average pixel value. If the results of the tests are all negative, the corresponding pixel value remains set to "off". If any of the results of the tests is positive, the corresponding pixel value is set to "on".

Figure 7:
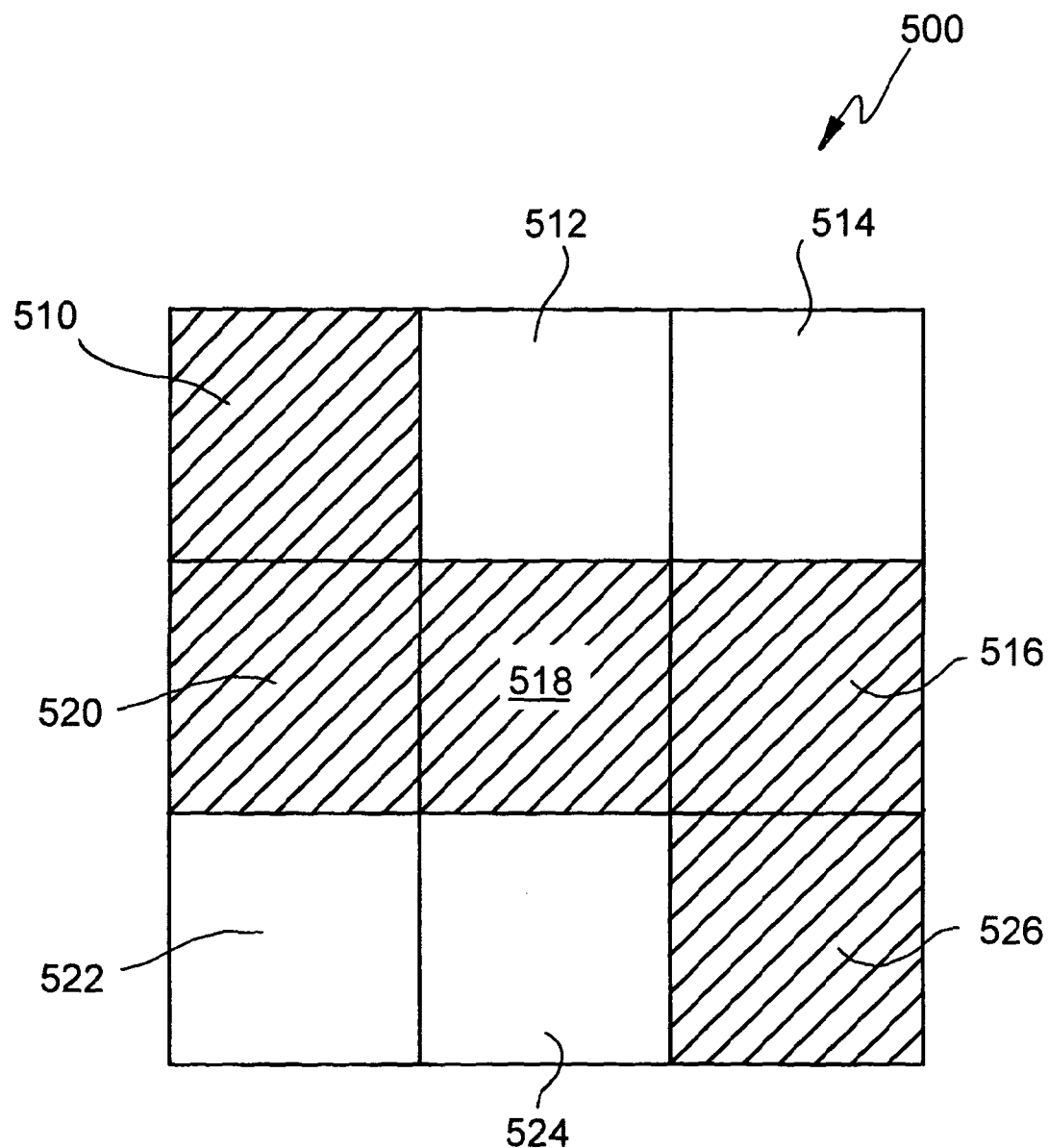
FIG. 7 is a schematic representation of a portion of an array of 1-bit pixel values that constitute a second intermediate array used to generate 1-bit image data.

FIG. 7 represents a portion 500 of the second intermediate array, "on" pixel values being represented by shaded squares and "off" pixel values being represented by unshaded squares. The square 510 represents the pixel value that corresponds to the average pixel value calculated from the sub-array 210 of FIG. 3. The squares 512, 514, 516, 518, 520, 522, 524 and 526 correspond to the average pixel values calculated from the sub-arrays 212, 214, 216, 218, 220, 222, 224 and 226 of FIG. 3.

The average pixel value calculated from the sub-array 210 of FIG. 3 is 134 to the nearest whole number. As the average pixel value is greater than 127, the error diffusion algorithm determines that the corresponding pixel value of the second intermediate array should be set to "on".

The following series of tests are therefore carried out.
 (a) If the average pixel value is less than or equal to 50%, i.e. 127 for 8-bit image data, would setting the pixel value of the second intermediate array to "on" cause a row of more than 4 horizontally adjacent "on" values or a column of more than 4 vertically adjacent "on" values?
 (b) If the average pixel value is greater than 50% and less than or equal to 62.5%, would setting the pixel value of the second intermediate array to "on" cause a row of more than int (4+((average pixel value−50)/12.5)*7) horizontally adjacent "on" values or a column of more than int (4+((average pixel value−50)/12.5)*7) vertically adjacent "on" values?
 (c) If the average pixel value is less than or equal to 28.125%, would setting the pixel value of the second intermediate array to "on" cause a chain of 3 horizontally and/or vertically adjacent "on" values?
 (d) If the average pixel value is less than or equal to 50%, would setting the pixel value to "on" cause a block of 2*2 horizontally and vertically adjacent "on" values?
 (e) If the average pixel value is greater than 50% and less than 56.25%, would setting the pixel value to "on" cause a block of 2*3 or 3*2 horizontally and vertically adjacent "on" values?
 (f) If the average pixel value is greater than 56.25% and less than or equal to 62.5%, would setting the pixel value to "on" cause a block of 3*3 or 2*4 or 4*2 horizontally and vertically adjacent "on" values?
 (g) If the average pixel value is greater than 62.5% and less than or equal to 68.75%, would setting the pixel value to "on" cause a block of 3*4 or 4*3 or 2*6 or 6*2 horizontally and vertically adjacent "on" values?
 (h) If the average pixel value is greater than 68.75% and less than or equal to 75%, would setting the pixel value to "on" cause a block of 4*4 or 3*5 or 5*3 or 2*7 or 7*2 horizontally and vertically adjacent "on" values?
 (i) If the average pixel value is greater than 75% and less than or equal to 82.5%, would setting the pixel value to "on" cause a block of 4*5 or 5*4 or 3*7 or 7*3 or 2*10 or 10*2 horizontally and vertically adjacent "on" values?

In this instance, because the average pixel value is the first pixel value of the first intermediate array to be processed, all of the pixel values of the second intermediate array are "off" by default and the results of all of the tests are negative. The pixel value 510 is therefore set to "on".

Had the error diffusion algorithm determined that the corresponding pixel value should remain "off", a corresponding series of tests would have been carried out. The test corresponding to test (a), for example, is "If the average pixel value is greater than or equal to 50%, would setting the pixel value of the second intermediate array to "off" cause a row of more than 4 horizontally adjacent "off" values or a column of more than 4 vertically adjacent "off" values?". The test corresponding to test (i) is "If the average pixel value is less than 25% and greater than or equal to 17.5%, would setting the pixel value to "off" cause a block of 4*5 or 5*4 or 3*7 or 7*3 or 2*10 or 10*2 horizontally and vertically adjacent "off" values?".

By setting the pixel value of the second intermediate array to "on", the corresponding average pixel value of 134 of the first intermediate array has effectively been represented by a pixel value of 255, the pixel values of the second array being constrained to be either 0 or 255, which correspond to "off" and "on" respectively. An error value of 255−134=121 is therefore generated and subtracted from the average pixel value of the sub-array 212.

With the exception of portions of the image of which the densities of dots are low, and only then if it was determined in operation 140 that single dots are to be used in portions of the image of which the densities of dots are low, a dot must always form a pair with a horizontally or vertically adjacent dot. This means that a horizontally or vertically adjacent pixel value of the second intermediate array must also be set to "on", so that the image contains a pair of horizontally or vertically adjacent dots. The horizontally or vertically adjacent pixel value is chosen at random. In this instance, the vertically adjacent pixel value 520 is chosen and set to "on".

Processing of the first intermediate array moves to the average pixel value calculated from the sub-array 212. The average pixel value is 141 to the nearest whole number. The result of subtracting the error of 121 diffused from the previous average pixel value from the average pixel value 141 is 20. As this is less than 127, the error diffusion algorithm determines that the pixel value 512 of the second intermediate array should remain "off".

The results of the corresponding series of tests are all negative so the pixel value 512 remains "off". Again, with the exception of portions of the image of which the densities of dots are high, and only then if it was determined in operation 140 that single dots are to be used in portions of the image of which the densities of dots are low, and that also therefore single non-dots are to be used in portions of the image of which the densities of dots are high, a non-dot must always form a pair with a horizontally or vertically adjacent non-dot. This means that a pixel value horizontally or vertically adjacent to the pixel value 512 must also remain "off". In this instance the horizontally adjacent pixel value 514 is chosen.

By maintaining the pixel value 512 "off", the result of the corresponding average pixel value less the error diffused from the previous pixel value, that is 20, has effectively been represented by a pixel value of 0. An error value of 0−20=−20 is therefore generated and subtracted from the average pixel value of the sub-array 214.

Processing of the first intermediate array moves to the average pixel value calculated from the sub-array 214. The average pixel value is 137 to the nearest whole number. The result of subtracting the error of −20 diffused from the previous average pixel value from the average pixel value 137 is 157. Although this is greater than 127, the pixel value 514 has already been determined to remain "off", so as to form a pair with the "off" pixel value 512. An error value of 0-157=−157 is therefore generated and subtracted from the average pixel value of the sub-array 516.

Processing moves to the average pixel value calculated from the sub-array 216. The average pixel value is 139 to the nearest whole number. The result of subtracting the error of −157 diffused from the previous average pixel value from the average pixel value 139 is 296. As this is greater than 127, the error diffusion algorithm determines that the pixel value 516 of the second intermediate array should be set to "on".

The results of the series of tests are all negative so the pixel value 516 is set to "on". The horizontally adjacent pixel value 518 is chosen as the adjacent pixel that is to be set to "on" so that the pixel values 516 and 518 form a pair. An error value of 255−296=−41 is generated and subtracted from the average pixel value of the sub-array 218.

Processing moves to the average pixel value calculated from the sub-array 218. The average pixel value is 143. The result of subtracting the error of −41 diffused from the previous average pixel value from the average pixel value 143 is 184. As the pixel value 518 has already been determined to be set to "on", the tests are not carried out and an error value of 255−184=71 is generated and subtracted from the average pixel value of the sub-array 220.

Processing moves to the average pixel value calculated from the sub-array 220. The average pixel value is 137 to the nearest whole number. The result of subtracting the error of 71 diffused from the previous average pixel value from the average pixel value 137 is 66. Although this is less than 127, the pixel value 520 has already been is set to "on", so as to form a pair with the pixel value 510. An error value of 255−66=189 is therefore generated and subtracted from the average pixel value of the sub-array 222.

Processing moves to the average pixel value calculated from the sub-array 222. The average pixel value is 127 to the nearest whole number. The result of subtracting the error of 189 diffused from the previous average pixel value from the average pixel value 127 is −62. As this is less than 127, the error diffusion algorithm determines that the pixel value 522 should remain "off".

The results of the corresponding series of tests are all negative so the pixel value 522 remains "off". The horizontally adjacent pixel value 524 is chosen as the adjacent pixel that is to remain "off" so that the pixel values 522 and 524 form a pair. An error value of 0−(−62)=62 is generated and subtracted from the average pixel value of the sub-array 224.

Processing moves to the average pixel value calculated from the sub-array 224. The average pixel value is 133 to the nearest whole number. The result of subtracting the error of 62 diffused from the previous average pixel value from the pixel value 133 is 71. As the pixel value 524 has already been determined to remain "off", the tests are not carried out and an error value of 0−71=−71 is generated and subtracted from the average pixel value of the sub-array 226.

Processing moves to the average pixel value calculated from the sub-array 226. The average pixel value is 131 to the nearest whole number. The result of subtracting the error of −71 diffused from the previous average pixel value from the pixel value 131 is 202. As this is greater than 127, the error diffusion algorithm determines that the pixel value 526 should be set to "on".

The series of tests set out above is carried out, the results all being negative. The pixel value 526 is therefore set to "on". There is no need to set a horizontally or vertically adjacent pixel value to "on" because the pixel value 516 is vertically adjacent to the pixel value 526 and is set to "on", so that the pixel values 516 and 526 form a pair.

As can be seen from this simple example, the specimen multiple-bit image data of FIG. 3 have an average value of 136 to the nearest whole number. This corresponds to approximately 53%, the maximum possible value of the multiple-bit data being 255. Accordingly, five of the nine pixel values of the second intermediate array that correspond to the nine average pixel values of the first intermediate array calculated from the nine sub-arrays shown in FIG. 3 are "on". It is to be noted that the operation of the computer program of the invention is such that, as shown in FIG. 7, isolated pairs of diagonally adjacent "on" pixel values do not occur, pairs of diagonally adjacent "on" pixel values such as 510 and 518, and 518 and 526, either forming a triplet with a third "on" pixel value such as 520 or 516, or forming a quadruplet, each of the pair of diagonally adjacent "on" pixel values forming a pair with a (shared) horizontally or vertically adjacent "on" pixel value.

Figure 10:
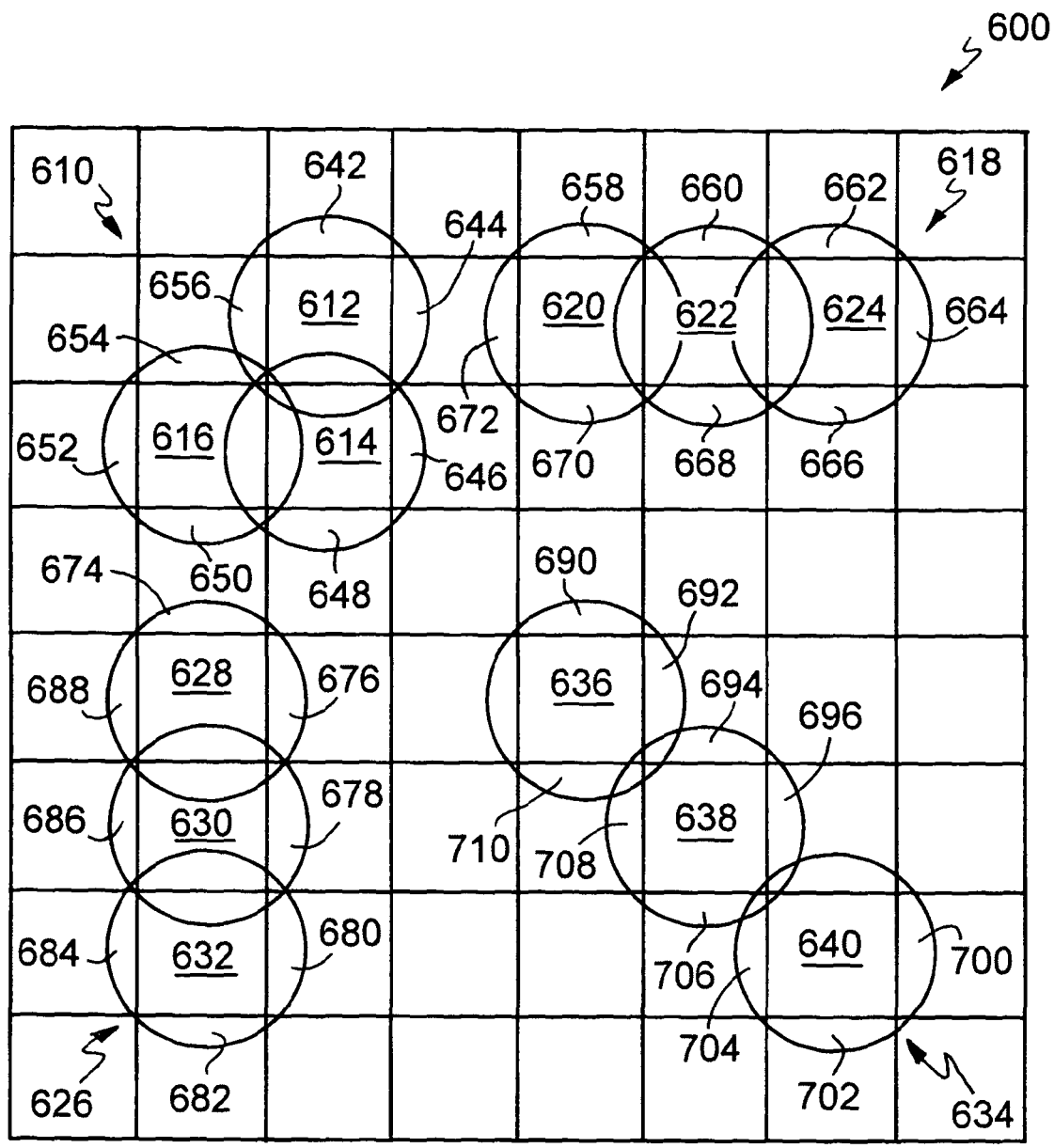
FIG. 10 is a schematic representation of a portion of an output medium.

Referring to FIG. 10, this represents a portion 600 of an output medium on which an isolated triplet 610 of horizontally and vertically adjacent pixels 612, 614 and 616, an isolated triplet 618 of horizontally adjacent pixels 620, 622 and 624, an isolated triplet 626 of vertically adjacent pixels 628, 630 and 632, and an isolated triplet 634 of diagonally adjacent pixels 636, 638 and 640 have been marked.

In images produced by the computer program of the invention the isolated triplet 610 of horizontally and vertically adjacent marked pixels could occur, because the marked pixels 612 and 614 form a pair of vertically adjacent dots, the marked pixels 614 and 616 form a pair of horizontally adjacent dots, and the marked pixel 614 of each pair of dots forms pairs with two horizontally or vertically adjacent dots 612 and 614.

Similarly, the isolated triplet 618 of horizontally adjacent marked pixels could occur, because the marked pixels 620 and 622 form a pair of horizontally adjacent dots, the marked pixels 622 and 624 form a pair of horizontally adjacent dots, and the marked pixel 622 of each pair of dots forms pairs with two horizontally adjacent dots 620 and 624.

Similarly, the isolated triplet 626 of vertically adjacent marked pixels could occur, because the marked pixels 628 and 630 form a pair of vertically adjacent dots, the marked pixels 630 and 632 form a pair of vertically adjacent dots, and the marked pixel 630 of each pair of dots forms pairs with two vertically adjacent dots 628 and 632.

On the other hand, the isolated triplet 634 of diagonally adjacent marked pixels could never occur, because none of the marked pixels 636, 638 and 640 forms a pair of horizontally or vertically adjacent dots.

As can be seen from FIG. 10, marking of the triplet 610 causes eight regions of the surrounding pixels also to be marked, the regions being denoted by reference numerals 642, 644, 646, 648, 650, 652, 654 and 656. Marking of the triplet 618 also causes eight regions of the surrounding pixels also to be marked, the regions being denoted by reference numerals 658, 660, 662, 664, 666, 668, 670 and 672. Marking of the triplet 626 also causes eight regions of the surrounding pixels also to be marked, the regions being denoted by reference numerals 674, 676, 678, 680, 682, 684, 686 and 688.

Marking of the triplet 634, on the other hand, would cause twelve regions of the surrounding pixels also to be marked, the regions being denoted by reference numerals 690, 692, 694, 696, 698, 700, 702, 704, 706, 708, 710 and 712.

Were isolated triplets of diagonally adjacent pixels such as 634 to be marked, as can happen using known computer programs, they would appear darker than isolated triplets of horizontally or vertically adjacent pixels such as 610, 618 and 626, which would give rise to the appearance of patterning of the image. By preventing marking of isolated triplets of diagonally adjacent pixels, or isolated longer lines of diagonally adjacent pixels, the invention eliminates a significant cause of the appearance of patterning of the image.

If in operation 140 it had been determined that single dots were to be used in portions of the image of which the densities of dots are low, the operation of the program would differ from that described above as follows.

Where it is determined from an average pixel value of the first intermediate array that a corresponding pixel value of the second intermediate array should be set to "on", a horizontally or vertically adjacent pixel value will only be set to "on" to form a pair with that pixel value if the average pixel value is greater than 26, that is approximately 10%. Similarly, where it is determined from an average pixel value of the first intermediate array that a corresponding pixel value of the second intermediate array should be set to "off", a horizontally or vertically adjacent pixel value will only be set to off to form a pair with that pixel value if the average pixel value is less than 230, that is approximately 90%.

Once all of the average pixel values of the first intermediate array have been processed, the (M/4)*(N/4) "on" and "off" pixel values that constitute the second intermediate array are converted into an array of M*N "on" and "off" pixel values. In the present case, each "on" pixel of the second intermediate array is converted into a block of 4*4 horizontally and vertically adjacent "on" pixel values, which, when marked on an output medium constitute a 4*4 pixel dot.

If in operation 150 it had been determined that reduced-sized pairs of dots were to be used in portions of the image of which the densities of dots are low, isolated pairs of horizontally and vertically adjacent "on" pixel values of the second intermediate array would be identified before conversion of the second intermediate array into an array of M*N "on" and "off" pixel values. For each such isolated pair of horizontally or vertically adjacent "on" pixel values of the second array, it would be determined whether the average pixel values of the first intermediate array corresponding to the pair of "on" pixel values are both less than 51, that is 20%. If both average pixel values are less than 15, instead of converting such pairs of horizontally and vertically adjacent "on" pixel values into blocks of 8*4 and 4*8 horizontally and vertically adjacent "on" pixel values, the pairs would be converted into blocks of 6*4 and 4*6 horizontally and vertically adjacent "on" pixel values, such as give rise to the pairs 322 and 328 of dots shown in FIG. 5.

If in operation 160 it had been determined that reduced-size dots were to be used, instead of converting each "on" pixel value of the second intermediate array into a block of 4*4 horizontally and vertically adjacent "on" pixel values, each "on" pixel value of the second intermediate array would be converted into a block of 3*3 horizontally and vertically adjacent "on" pixel values, such as give rise to the dots 418 and 420 shown in FIG. 6.

In an optional feature of the invention, once the 1-bit image data have been derived, minimum and maximum values of the multiple-bit image data are identified. That is to say, for 8-bit image data, pixel values of 0 and 255 of the multiple-bit image data are identified. For each identified pixel value of 0 of the multiple-bit image data, the corresponding pixel value of the 1-bit image data is set to "off". For each identified pixel value of 255, the corresponding pixel value of the 1-bit image data is set to "on".

The effect of this is that fine details of the image that is represented by the multiple-bit image data, such as text and straight lines in graphics, are preserved in the image produced when the 1-bit image data are printed.

Figure 8A:
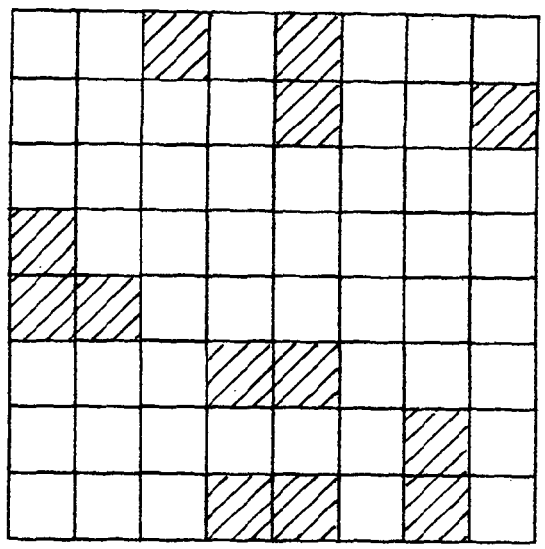
FIGS. 8a, 8b and 8c are typical patterns of dots from an image produced by the computer program of the invention.
Figure 8B:
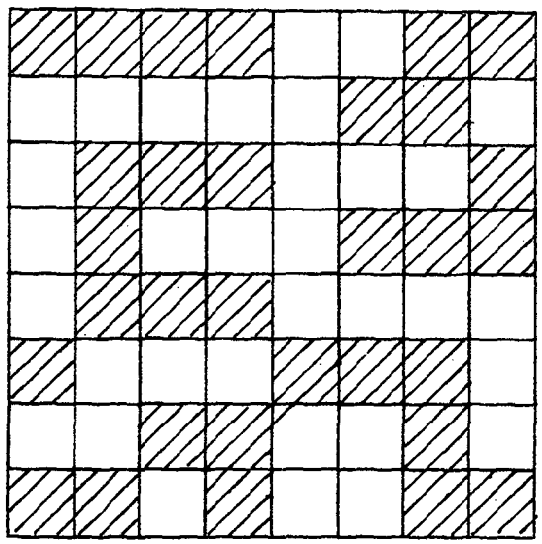
Figure 8C:
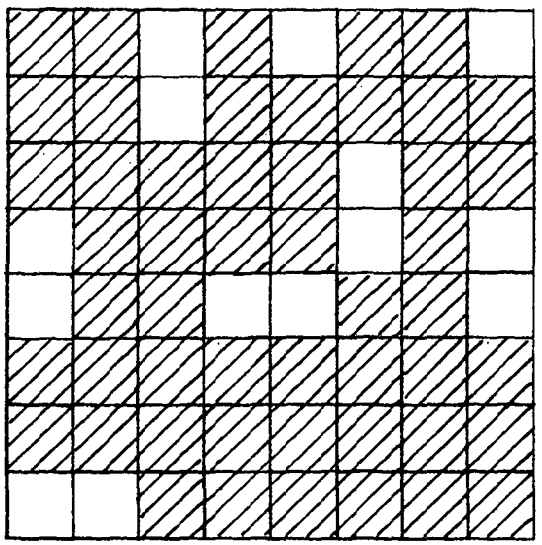

FIGS. 8a, 8b and 8c show typical patterns of dots produced in images by the invention for densities of dots of approximately 20%, 50% and 80%, respectively. It can be seen that, in essence, the invention provides an FM screening process that produces images made up, in portions of the image of which the densities of dots are low, of pairs of horizontally and vertically adjacent dots, in portions of the image of which the densities of dots are higher, of chains of similar numbers of horizontally and vertically adjacent dots, in portions of the image of which the densities of dots are higher still, of chains of similar numbers of horizontally and vertically adjacent non-dots, and in portions of the image of which the densities of dots are highest, of pairs of horizontally and vertically adjacent non-dots. Pairs of isolated diagonally adjacent dots, that is diagonally adjacent dots surrounded by non-dots, are avoided as far as possible.

Figure 9:
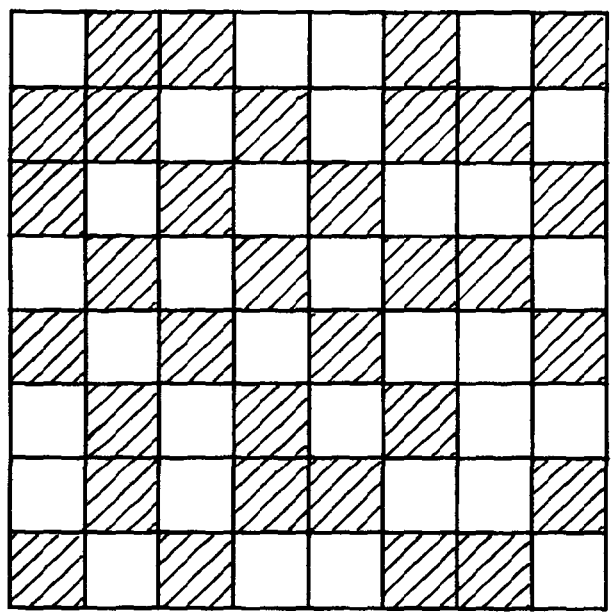
FIG. 9 is a typical pattern of dots from an image produced by a known computer program.

FIG. 9 shows, for the purpose of comparison, a typical pattern of dots produced in images by known FM screening processes for densities of dots of approximately 50%. The dots form a characteristic "chequer board and thin line" pattern which, when repeated across a portion of an image, is very conspicuous. Where such a pattern of dots is printed using an output device that produces dot gain, the large numbers of isolated diagonally adjacent dots produce a severe appearance of patterning of the image.

It will be appreciated that the foregoing description relates to only one embodiment of the invention and that the invention encompasses other embodiments as defined by the claims. In particular it will be apparent to a person skilled in the art that the program could be modified for use with output devices that can accept multiple-bit image data, such as 2-bit image data, and can vary the manner in which they mark an output medium, for example by marking regions of varying size of the output medium, in dependence upon the multiple-bit image data. It will also be apparent that other error diffusion algorithms could be used to implement the invention, such as a two-dimensional error diffusion algorithm instead of the simple, one-dimensional error diffusion algorithm described above, an example of such a two-dimensional error diffusion algorithm being the Floyd-Steinberg algorithm.

The invention claimed is:

1. A computer system executed process for generating 1-bit image data from multiple-bit image data, the process comprising the steps of:
receiving, by the computer system, multiple-bit image data comprising multiple-bit pixel values; and
deriving, by the computer system, from the multiple-bit pixel values 1-bit image data comprising "on" and "off" pixel values, each pixel value of the 1-bit image data corresponding to a pixel of an output medium, which pixel an output device would attempt to mark when printing the 1-bit image data if the pixel value were "on", the 1-bit image data producing when printed an image constituted by a plurality of densities of dots, the dots being arranged such that, at least for densities of dots greater than a first threshold density, at least a majority of dots form a pair with at least one horizontally or vertically adjacent dot, and for densities of dots less than a second threshold density, the image is substantially free of blocks of 2*2 horizontally and vertically adjacent dots, the second threshold density being greater than the first threshold density.

2. The process of claim 1, wherein at least for densities of dots greater than the first threshold density and less than a third threshold density, at least a majority of dots form a pair with one horizontally or vertically adjacent dot, the third threshold density being less than the second threshold density.

3. The process of claim 1, wherein for all densities of dots, at least a majority of dots form a pair with at least one horizontally or vertically adjacent dot.

4. The process of claim 1, wherein for densities of dots less than the first threshold density, at least some of the dots have no adjacent dots.

5. The process of claim 2, wherein for densities of dots greater than a fourth threshold density, at least one dot of at least a majority of pairs of dots forms pairs with two horizontally or vertically adjacent dots, the fourth threshold density being greater than the third threshold density and less than the second threshold density.

6. The process of claim 1, wherein for densities of dots less than a fifth threshold density, at least a majority of dots form chains of horizontally or vertically adjacent dots, the chains having similar numbers of dots, and the fifth threshold density being less than the second threshold density.

7. The process of claim 1, wherein the second threshold density, for densities of dots less than which the image is substantially free of blocks of 2*2 horizontally and vertically adjacent dots, is halfway between a minimum available density of dots and a maximum available density of dots.

8. The process of claim 1, wherein each dot of the image corresponds to a single pixel value of the 1-bit image data.

9. The process of claim 1, wherein each dot of the image corresponds to a plurality of pixel values of the 1-bit image data.

10. The process of claim 9, wherein the plurality of pixel values correspond to a rectangular or substantially rectangular block of horizontally and vertically adjacent pixels of an output medium.

11. The process of claim 10, wherein at least one of the plurality of pixel values is "off".

12. The process of claim 11, wherein for densities of dots less than the first threshold density, for at least a majority of pairs of horizontally adjacent dots, at least the pixel values corresponding to a first column of vertically adjacent pixels and a last column of vertically adjacent pixels of the pair of blocks of horizontally and vertically adjacent pixels are "off", and for at least a majority of pairs of vertically adjacent dots, at least the pixel values corresponding to a first row of horizontally adjacent pixels and a last row of horizontally adjacent pixels of the pair of blocks of horizontally and vertically adjacent pixels are "off".

13. The process of claim 11, wherein for at least a majority of dots, at least some of the pixel values corresponding to at least one of first and last columns of vertically adjacent pixels and at least one of first and last rows of horizontally adjacent pixels of the block of horizontally and vertically adjacent pixels are "off".

14. The process of claim 1, wherein the step of deriving, by the computer system, from the multiple-bit pixel values 1-bit image data comprising "on" and "off" pixel values further comprises identifying, by the computer system, multiple-bit pixel values of the multiple-bit image data equal to a minimum available multiple-bit pixel value or a maximum available multiple-bit pixel value, and for each minimum available multiple-bit pixel value generating, by the computer system, a corresponding "off" pixel value of the 1-bit image data, and for each maximum available multiple-bit pixel value generating, by the computer system, a corresponding "on" value of the 1-bit image data.

15. An output device having non-transitory computer readable storage media including computer-executable instructions that when executed direct the output device to perform the process of claim 1.

16. A method of electronically generating 1-bit image data from multiple-bit image data, the 1-bit image data comprising "on" and "off" pixel values, each pixel value of the 1-bit image data corresponding to a pixel of an output medium, which pixel an output device would attempt to mark when printing the 1-bit image data if the pixel value were "on", the method comprising the steps of:
   storing, by a computer system, multiple-bit image data comprising multiple-bit pixel values in electronic memory; and
   deriving, by the computer system, from the multiple-bit pixel values and storing in electronic memory 1-bit image data that produce when printed an image constituted by a plurality of densities of dots, the dots being arranged such that, at least for densities of dots greater than a first threshold density, at least a majority of dots form pairs with at least one horizontally or vertically adjacent dot, and for densities of dots less than a second threshold density, the image is substantially free of blocks of 2*2 horizontally and vertically adjacent dots, the second threshold density being greater than the first threshold density.

17. A method of electronically generating 1-bit image data from multiple-bit image data, the 1-bit image data comprising "on" and "off" pixel values, each pixel value of the 1-bit image data corresponding to a pixel of an output medium, which pixel an output device would attempt to mark when printing the 1-bit image data if the pixel value were "on", the method comprising the steps of:
   storing, by a computer system, multiple-bit image data comprising multiple-bit pixel values in electronic memory; and
   deriving, by the computer system, from the multiple-bit pixel values and storing in electronic memory 1-bit image data that produce when printed an image constituted by a plurality of densities of dots, the dots being arranged such that, at least for densities of dots greater than a first threshold density, at least a majority of dots form pairs with at least one horizontally or vertically adjacent dot, for densities of dots less than a second threshold density, the image is substantially free of blocks of 2*2 horizontally and vertically adjacent dots, at least for densities of dots less than a third threshold density, at least a majority of portions of the image that could be occupied by a dot, but are not so occupied, henceforth referred to as "non-dots", form pairs with at least one horizontally or vertically adjacent non-dot, and for densities of dots greater than a fourth density, the image is substantially free of blocks of 2*2 horizontally and vertically adjacent non-dots, the second threshold density being greater than the first threshold density, the third threshold density being greater than the fourth threshold density, and the fourth threshold density being approximately equal to the second threshold density.

18. A method of electronically generating 1-bit image data from multiple-bit image data, the 1-bit image data comprising "on" and "off" pixel values, each pixel value of the 1-bit image data corresponding to a pixel of an output medium, which pixel an output device would attempt to mark when printing the 1-bit image data if the pixel value were "on", the method comprising the steps of:
   storing, by a computer system, multiple-bit image data comprising multiple-bit pixel values in electronic memory; and
   deriving, by the computer system, from the multiple-bit pixel values and storing in electronic memory 1-bit image data that produce when printed an image constituted by a plurality of densities of dots, the dots being arranged such that, for densities of dots greater than a first threshold density and less than a second threshold density, at least a majority of dots form a pair with one horizontally or vertically adjacent dot, for densities of dots greater than the second threshold density and less than a third threshold density, at least a majority of pairs of horizontally and vertically adjacent dots form a triplet with one horizontally or vertically adjacent dot, and for densities of dots greater than the third threshold density and less than a fourth threshold density, at least a majority of dots form triplets with two horizontally or vertically adjacent dots, the second threshold density being greater than the first threshold density, the third threshold density being greater than the second threshold density, and the fourth threshold density being greater than the third threshold density.

19. The method of claim 18, wherein for each density of dots between the third and fourth threshold densities, at least a majority of dots form parts of chains of horizontally and vertically adjacent dots, and at least a majority of the chains do not differ in a number of dots constituting the chains by more than one.

20. A method of electronically generating 1-bit image data from multiple-bit image data, the 1-bit image data comprising "on" and "off" pixel values, each pixel value of the 1-bit image data corresponding to a pixel of an output medium, which pixel an output device would attempt to mark when printing the 1-bit image data if the pixel value were "on", the method comprising the steps of:
   storing, by a computer system, multiple-bit image data comprising multiple-bit pixel values in electronic memory; and
   deriving, by the computer system, from the multiple-bit pixel values and storing in electronic memory 1-bit image data that produce when printed an image constituted by a plurality of densities of dots, the dots being arranged such that, for densities of dots greater than a first threshold density, at least a majority of dots form a pair with a horizontally or vertically adjacent dot, for densities of dots greater than a second threshold density, some pairs of dots form a triplet with a horizontally or vertically adjacent dot, and for densities of dots greater than a third threshold density, at least a majority of pairs of dots form a triplet with a horizontally or vertically adjacent dot, the second threshold density being greater than the first threshold density and the third threshold density being greater than the second threshold density, and for each density of dots between the first and third threshold densities, numbers of dots constituting substantially all isolated groups of horizontally and vertically adjacent dots differing by no more than one.

21. Non-transitory computer readable storage media including computer-executable instructions that when executed direct a computer to perform the method of claim 20.

22. A computer programmed to perform the method of claim 20.

23. Non-transitory computer readable storage media including computer-executable instructions that when executed direct a computer to perform the method of claim 16.

24. A computer programmed to perform the method of claim 16.

25. Non-transitory computer readable storage media including computer-executable instructions that when executed direct a computer to perform the method of claim 17.

26. A computer programmed to perform the method of claim 17.

27. Non-transitory computer readable storage media including computer-executable instructions that when executed direct a computer to perform the method of claim 18.

28. A computer programmed to perform the method of claim 18.

\* \* \* \* \*